(12) United States Patent
Hong et al.

(10) Patent No.: US 10,958,439 B2
(45) Date of Patent: Mar. 23, 2021

(54) APPARATUS AND METHOD FOR RELIABLE QUANTUM SIGNATURE

(71) Applicant: ELECTRONICS AND TELECOMMUNICATIONS RESEARCH INSTITUTE, Daejeon (KR)

(72) Inventors: Changho Hong, Seoul (KR); Nayoung Kim, Daejeon (KR); Osung Kwon, Daejeon (KR); Se Wan Ji, Seoul (KR); Haeng-Seok Ko, Daejeon (KR); Jingak Jang, Daejeon (KR); Daesung Kwon, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 216 days.

(21) Appl. No.: 16/183,934

(22) Filed: Nov. 8, 2018

(65) Prior Publication Data

US 2019/0327095 A1    Oct. 24, 2019

(30) Foreign Application Priority Data

Apr. 20, 2018   (KR) .................. 10-2018-0046271

(51) Int. Cl.
*H04L 29/06* (2006.01)
*H04L 9/32* (2006.01)
(Continued)

(52) U.S. Cl.
CPC ........... *H04L 9/3247* (2013.01); *G06N 10/00* (2019.01); *H04L 9/0643* (2013.01)

(58) Field of Classification Search
CPC .............................. H04L 9/3247; H04L 9/0643
(Continued)

(56) References Cited

U.S. PATENT DOCUMENTS

| | | | | |
|---|---|---|---|---|
| 2002/0199108 A1* | 12/2002 | Chuang | ................. | H04L 9/3247 713/176 |
| 2004/0252836 A1* | 12/2004 | Yoshida | ................ | H04L 9/3242 380/268 |
| 2006/0056631 A1* | 3/2006 | Beausoleil | ............. | G06N 10/00 380/256 |

FOREIGN PATENT DOCUMENTS

| | | |
|---|---|---|
| KR | 10-2004-0077152 A | 9/2004 |
| KR | 10-0505335 B1 | 8/2005 |
| KR | 10-1675674 B1 | 11/2016 |

OTHER PUBLICATIONS

Chen, Public-key quantum digital signature scheme with one-time pad private-key, Nov. 2017, Springer, pp. 1-14 (Year: 2017).*

(Continued)

*Primary Examiner* — Taghi T Arani
*Assistant Examiner* — Gregory A Lane
(74) *Attorney, Agent, or Firm* — LRK Patent Law Firm

(57) ABSTRACT

An apparatus and method for a reliable quantum signature. The method using the apparatus for a reliable quantum signature includes preparing a quantum signature by sharing a first secret key and a first Bell state with a signer's terminal device and by sharing a second secret key and a second Bell state with a verifier's terminal device; signing, by the signer's terminal device, a message with the quantum signature using a first encoding value, the first secret key, and the first Bell state; verifying, by the apparatus, the quantum signature of the message using the first encoding value, the first secret key, and the first Bell state; and finally verifying, by the apparatus, the quantum signature of the message using the verifier's terminal device, a second encoding value, a third encoding value, the second secret key, and the second Bell state.

17 Claims, 5 Drawing Sheets

(51) Int. Cl.
*H04L 9/06* (2006.01)
*G06N 10/00* (2019.01)

(58) Field of Classification Search
USPC .......................................................... 713/176
See application file for complete search history.

(56) References Cited

OTHER PUBLICATIONS

Ke-Jia Zhang et al., "Cryptanalysis of the quantum group signature protocols," International Journal of Theoretical Physics (2013) 52:4163-4173.

Qin Li et al., "On the existence of quantum signature for quantum messages," International Journal of Theoretical Physics (2013) 52:4335-4341.

\* cited by examiner $$\begin{cases} R_y(\theta_{K_{TAi}}) \equiv \exp\left(\frac{-i\theta_{K_{TAi}}\sigma_y}{2}\right) = \cos\frac{\theta_{K_{TAi}}}{2}I - i\sin\frac{\theta_{K_{TAi}}}{2}\sigma_y \\ r_a = \{(r_{a1}^1, r_{a2}^1), (r_{a1}^2, r_{a2}^2), \ldots, (r_{a1}^n, r_{a2}^n)\} \\ \alpha_i = h(m_1)^i\, h(m_2)^i \oplus r_{a1}^i\, r_{a2}^i \end{cases}$$

$$\underrightarrow{|sign^A\rangle = R_y(\theta_{K_{TAi}})\,\alpha_i\,|A_i\rangle}$$

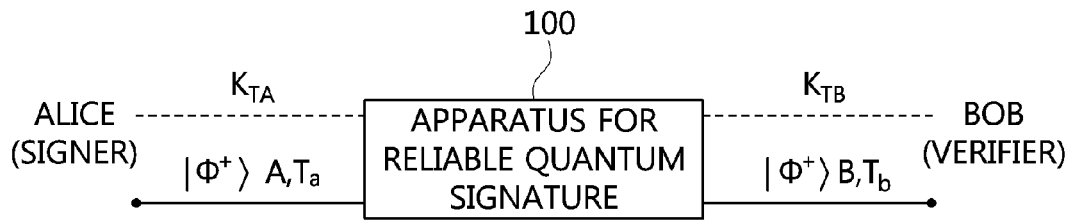

$$\begin{cases} R_y(\theta_{K_{TBi}}) \equiv \exp\left(\dfrac{-i\theta_{K_{TBi}}\sigma_y}{2}\right) = \cos\dfrac{\theta_{K_{TBi}}}{2} I - i\sin\dfrac{\theta_{K_{TBi}}}{2}\sigma_y \\ r_b = \{(r_{b1}^1, r_{b2}^1), (r_{b1}^2, r_{rb2}^2), \ldots, (r_{b1}^{n/2}, r_{b2}^{n/2})\} \\ \beta_l = h(m_1)^l\, h(m_2)^l \oplus r_{a1}^{l\prime}\, r_{a2}^{l\prime} \oplus r_{b1}^l\, r_{b2}^l \end{cases}$$

$$\xrightarrow{\ |sign^{A'}\rangle = R_y(\theta_{K_{TBi}})\,\beta_l|T_{Bl}\rangle\ }$$

$$\gamma_l = r_{a1}^{l\prime}\, r_{a2}^{l\prime} \oplus r_{b1}^l\, r_{b2}^l$$

$$\xleftarrow{\ \gamma\ }$$

$$\xrightarrow{\ r_a\ }$$

$$\overset{?}{r_a = r_a'}$$

APPARATUS AND METHOD FOR RELIABLE QUANTUM SIGNATURE

CROSS REFERENCE TO RELATED APPLICATION

This application claims the benefit of Korean Patent Application No. 10-2018-0046271, filed Apr. 20, 2018, which is hereby incorporated by reference in its entirety into this application.

BACKGROUND OF THE INVENTION

1. Technical Field

The present invention relates generally to quantum communications technology, and more particularly to a quantum signature scheme in which a digital signature scheme is designed in a quantal manner.

2. Description of the Related Art

Papers and patents on various quantum signature schemes, which are used to design digital signature schemes, which are one of the main methods of modern cryptography, in a quantal manner, have been published.

According to most released quantum signature schemes, a signer and a verifier have a one-to-one relationship. That is, there is only one verifier involved with a single signer. Originally, a digital signature scheme should enable a signed document to be validated by multiple verifiers. That is, it is common in practice for the expression 'signer:verifier=1:n' to be satisfied in modern cryptography digital signature schemes. According to the present invention, a one-to-one relationship between a signer and a verifier, which is a limitation of quantum signature schemes, may be extended to a one-to-n relationship.

There are three essential security services required of digital signatures.

First, integrity ensures that the content of a signed message is not changed.

Second, message authentication enables identification of the signer of a message.

Third, non-repudiation ensures that a signer cannot deny that the signer has signed after generating a signature. Conversely, non-repudiation ensures that a verifier is unable to falsely deny validity of the signature.

Generally, digital signature schemes may provide non-repudiation service using a Trust Center (TC). Similarly, most quantum signature schemes may provide non-repudiation service using a TC by transmitting quantum states three or more times (from a signer to a TC, from the TC to a verifier, and from the verifier to the TC). Here, the quantum signature schemes are required not only to provide security service but also to reduce the number of quantum states to be transmitted in order to reduce costs and improve efficiency.

In connection with this, Korean Patent No. 10-1675674 discloses a technology related to "Quantum signature apparatus for quantum message".

SUMMARY OF THE INVENTION

The present invention intends to reduce the amount of quantum communication compared to existing quantum signature schemes, thereby improving efficiency and reducing costs.

Also, the present invention intends to provide a quantum signature scheme in which multiple verifiers may validate a signature.

Also, the present invention intends to provide a secure quantum signature scheme that provides non-repudiation service.

In order to accomplish the above objects, a method for a reliable quantum signature, in which an apparatus for a reliable quantum signature is used, according to an embodiment of the present invention includes preparing a quantum signature by sharing a first secret key and a first Bell state with a signer's terminal device and by sharing a second secret key and a second Bell state with a verifier's terminal device; signing, by the signer's terminal device, a message with the quantum signature using a first encoding value, the first secret key, and the first Bell state; verifying, by the apparatus, the quantum signature of the message using the first encoding value, the first secret key, and the first Bell state; and finally verifying, by the apparatus, the quantum signature of the message using the verifier's terminal device, a second encoding value, a third encoding value, the second secret key, and the second Bell state.

Here, signing the message may be configured such that the signer's terminal device calculates the first encoding value by performing a cryptographic operation on the hash value of the message and a first random bit string.

Here, each of the hash value and the first random bit string may have a length of 2n and may be configured with n groups by grouping the bits thereof by two bits (n being a preset integer that is equal to or greater than 1).

Here, verifying the quantum signature may be configured such that the apparatus restores the first encoding value by receiving a first signature state for signing the message from the signer's terminal device and acquires a second random bit string using the hash value of the message.

Here, verifying the quantum signature may be configured to verify the quantum signature in such a way that the apparatus selects n bits from the second random bit string and checks whether the selected n bits match bits of the first random bit string that are located in the same positions as the selected n bits.

Here, finally verifying the quantum signature may be configured such that the apparatus calculates the second encoding value by performing a cryptographic operation on the hash value of the message from which bits located in the same positions as the selected n bits are excluded, the second random bit string from which the selected n bits are excluded, and a third random bit string.

Here, finally verifying the quantum signature may be configured such that the verifier's terminal device restores the second encoding value by receiving a second signature state for verifying the message from the apparatus and acquires the third encoding value using the hash value of the message from which the bits located in the same positions as the selected n bits are excluded.

Here, the third encoding value may be a result of a cryptographic operation performed on the second random bit string, from which the selected n bits are excluded, and the third random bit string.

Here, finally verifying the quantum signature may be configured such that the apparatus confirms that the verifier's terminal device publishes the third encoding value and confirms that the signer's terminal device publishes the first random bit string after confirming publication of the third encoding value.

Here, finally verifying the quantum signature may be configured such that the apparatus finally verifies the quantum signature by checking whether the third encoding value is equal to a fourth encoding value, which is acquired by performing a cryptographic operation on the first random bit string from which bits located in the same positions as the selected n bits are excluded and the third random bit string.

Also, in order to accomplish the above objects, an apparatus for a reliable quantum signature according to an embodiment of the present invention includes a quantum signature preparation unit for preparing a quantum signature by sharing a first secret key and a first Bell state with a signer's terminal device and by sharing a second secret key and a second Bell state with a verifier's terminal device; a first quantum signature verification unit for verifying the quantum signature of a message using a first encoding value, the first secret key, and the first Bell state, the message being signed with the quantum signature by the signer's terminal device using the first encoding value, the first secret key, and the first Bell state; and a second quantum signature verification unit for finally verifying the quantum signature of the message using the verifier's terminal device, a second encoding value, a third encoding value, the second secret key, and the second Bell state.

Here, the first encoding value may be calculated in such a way that the signer's terminal device performs a cryptographic operation on the hash value of the message and a first random bit string.

Here, each of the hash value and the first random bit string may have a length of 2n and may be configured with n groups by grouping the bits thereof by two bits (n being a preset integer that is equal to or greater than 1).

Here, the first quantum signature verification unit may restore the first encoding value by receiving a first signature state for signing the message from the signer's terminal device and may acquire a second random bit string using the hash value of the message.

Here, the first quantum signature verification unit may verify the quantum signature by selecting n bits from the second random bit string and checking whether the selected n bits match bits of the first random bit string that are located in the same positions as the selected n bits.

Here, the second quantum signature verification unit may calculate the second encoding value by performing a cryptographic operation on the hash value of the message from which bits located in the same positions as the selected n bits are excluded, the second random bit string from which the selected n bits are excluded, and a third random bit string.

Here, the second quantum signature verification unit may transmit a second signature state for verifying the message to the verifier's terminal device, thereby requesting restoration of the second encoding value and acquisition of the third encoding value using the hash value of the message from which the bits located in the same positions as the selected n bits are excluded.

Here, the third encoding value may be a result of a cryptographic operation performed on the second random bit string, from which the selected n bits are excluded, and the third random bit string.

Here, the second quantum signature verification unit may confirm that the verifier's terminal device publishes the third encoding value and confirm that the signer's terminal device publishes the first random bit string after confirming publication of the third encoding value.

Here, the second quantum signature verification unit may finally verify the quantum signature by checking whether the third encoding value is equal to a fourth encoding value, which is acquired by performing a cryptographic operation on the first random bit string from which bits located in the same positions as the selected n bits are excluded and the third random bit string.

BRIEF DESCRIPTION OF THE DRAWINGS

The above and other objects, features and advantages of the present invention will be more clearly understood from the following detailed description taken in conjunction with the accompanying drawings, in which:

FIG. 6 is a view that shows the process of verifying a quantum signature according to an embodiment of the present invention.

DESCRIPTION OF THE PREFERRED EMBODIMENTS

Figure 1:
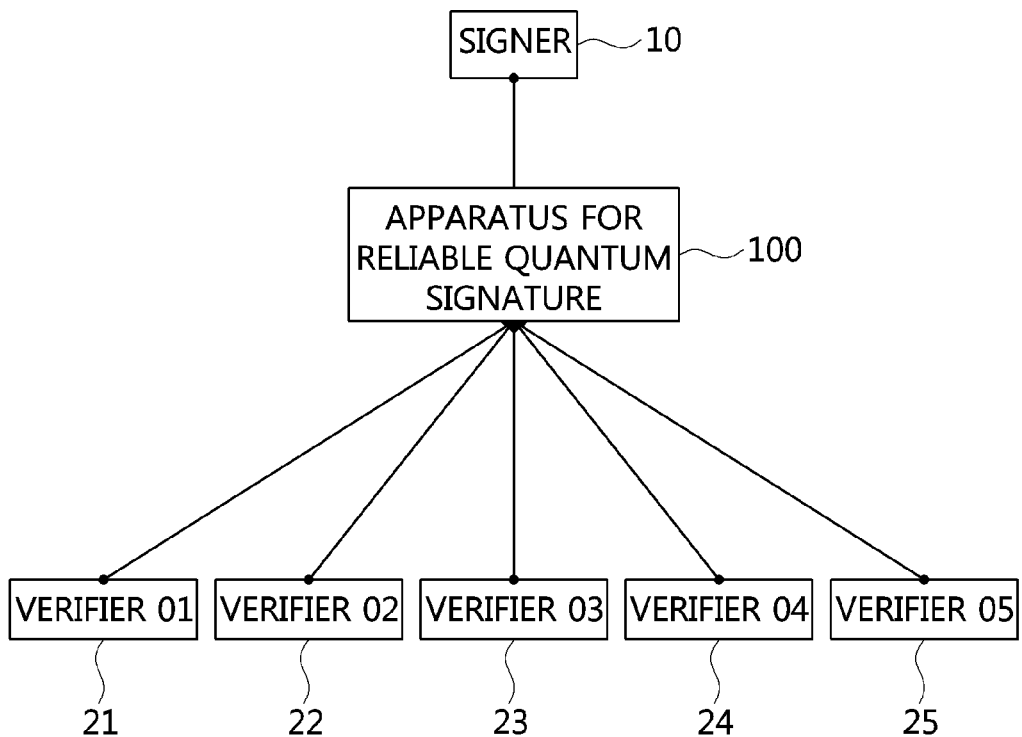
FIG. 1 is a block diagram that shows a structure for a quantum signature according to an embodiment of the present invention.

The present invention will be described in detail below with reference to the accompanying drawings. Repeated descriptions and descriptions of known functions and configurations which have been deemed to unnecessarily obscure the gist of the present invention will be omitted below. The embodiments of the present invention are intended to fully describe the present invention to a person having ordinary knowledge in the art to which the present invention pertains. Accordingly, the shapes, sizes, etc. of components in the drawings may be exaggerated in order to make the description clearer.

Throughout this specification, the terms "comprises" and/or "comprising" and "includes" and/or "including" specify the presence of stated elements but do not preclude the presence or addition of one or more other elements unless otherwise specified.

Hereinafter, a preferred embodiment of the present invention will be described in detail with reference to the accompanying drawings.

FIG. 1 is a block diagram that shows a structure for a quantum signature according to an embodiment of the present invention.

FIG. 1 shows a structure for a quantum signature according to an embodiment of the present invention.

The basic structure for a quantum signature according to an embodiment of the present invention includes multiple verifiers 21, 22, 23, 24 and 25 for a single signer 10. That is, although a single signer writes a signature, there may be multiple users that are capable of validating the signature.

Here, the signer may represent a signer's terminal device, and the verifier may represent a verifier's terminal device.

Here, the apparatus 100 for a reliable quantum signature may be a Trust Center (TC) that is capable of providing non-repudiation service.

The apparatus 100 for a reliable quantum signature and the respective users (the signer 10, and the verifiers 21, 22, 23, 24 and 25 may share a unique key. The signer may use the key shared with the apparatus 100 for a reliable quantum signature in order to sign a message, and the respective verifiers 21 to 25 may use the key shared with the apparatus 100 for a reliable quantum signature in order to validate the signature of the signer. The apparatus 100 for a reliable quantum signature and the signer may generate a unique random bit string and use the same in order to sign a message. The respective verifiers may decrypt the random bit string of the signer using information published on a public board. Here, the apparatus 100 for a reliable quantum signature validates the random bit string again, thereby verifying the validity of the signature of the signer.

Figure 2:
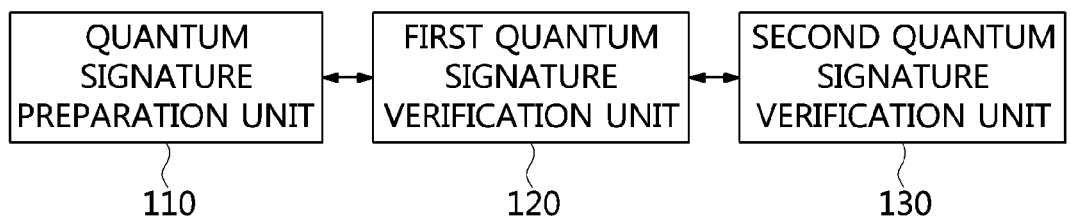
FIG. 2 is a block diagram that shows an apparatus for a reliable quantum signature according to an embodiment of the present invention.

FIG. 2 is a block diagram that shows an apparatus for a reliable quantum signature according to an embodiment of the present invention.

Referring to FIG. 2, the apparatus 100 for a reliable quantum signature according to an embodiment of the present invention includes a quantum signature preparation unit 110, a first quantum signature verification unit 120, and a second quantum signature verification unit 130.

The quantum signature preparation unit 110 may prepare a quantum signature by sharing a first secret key $K_{TA}$ and a first Bell state $|\Phi^+\rangle_{A,T_a}$ with a signer and by sharing a second secret key $K_{TB}$ and a second Bell state $|\Phi^+\rangle_{B,T_b}$ with a verifier.

First, the signer, the verifier, and the apparatus 100 for a reliable quantum signature, which are trusted users, may share a universal hash function h.

Here, the quantum signature preparation unit 110 may share the universal hash function with the signer and the verifier.

The universal hash function may satisfy Equation (1):

$$h:(0,1)^* \to (0,1)^{2n} \qquad (1)$$

That is, h may receive a bit string having an arbitrary length and output a bit string having a fixed length (2n).

Here, h may configure an efficient communication protocol by making use of a message reduction effect.

Also, h may perform message authentication as a one-way function.

Here, the quantum signature preparation unit 110 may share the first secret key $K_{TA}$ and the second secret key $K_{TB}$ With the signer (Alice) and the verifier (Bob), respectively. Here, the length of each of the first secret key $K_{TA}$ and the second secret key $K_{TB}$ must be equal to or greater than n.

Here, the quantum signature preparation unit 110 may share the keys using Quantum Key Distribution (QKD), which provides unconditional security.

Also, the quantum signature preparation unit 110 may prepare n first Bell states $|\Phi^+\rangle_{A,T_a}$ and n second Bell states $|\Phi^+\rangle_{B,T_b}$.

Bell states may be represented as shown in Equation (2):

$$|\Phi^+\rangle^A = \bigotimes_{i=1}^{n} |\Phi^+\rangle_{Ai,Ta_j} = \frac{1}{\sqrt{2}}\left(|00\rangle_{Ai,Ta^i} + |11\rangle_{Ai,Ta^i}\right) \qquad (2)$$

$$|\Phi^+\rangle^B = \bigotimes_{i=1}^{n} |\Phi^+\rangle_{Bi,Tb_j} = \frac{1}{\sqrt{2}}\left(|00\rangle_{Bi,Tb^i} + |11\rangle_{Bi,Tb^i}\right)$$

where i={1, 2, . . . , n}

Here, the quantum signature preparation unit 110 may divide the n first Bell states $|\Phi^+\rangle_{A,T_a}$ into an A-sequence and a $T_A$-sequence, and may divide the n second Bell states $|\Phi^+\rangle_{B,T_b}$ to a B-sequence and a $T_B$-sequence.

Here, each of the sequences may consist of n quantum bits (qubits).

Here, the n quantum bits may be represented as follows: the A-sequence is $(A_1, A_2, \ldots, A_n)$, the $T_A$-sequence is $(T_{a1}, T_{a2}, \ldots, T_{an})$, the B-sequence is $(B_1, B_2, \ldots, B_n)$, and the TB-sequence is $(T_{b1}, T_{b2}, \ldots, T_{bn})$.

Here, the quantum signature preparation unit 110 may transmit the A-sequence and the B-sequence to the signer and the verifier, respectively.

The quantum signature preparation unit 110 may keep the $T_A$-sequence and the $T_B$-sequence.

Here, the quantum signature preparation unit 110 may transmit the sequences using a transmission method in which decoy qubits are used in order to guarantee the security of a quantum channel.

Here, in order to securely transmit qubits in a sequence, the quantum signature preparation unit 110 may form a new sequence by mixing the qubits in the sequence with decoy qubits that are randomly selected from among $$|+\rangle\left(=\frac{1}{\sqrt{2}}(|0\rangle+|1\rangle)\right) \text{ and } |-\rangle\left(=\frac{1}{\sqrt{2}}(|0\rangle-|1\rangle)\right),$$

and may transmit the new sequence.

Here, when a recipient announces reception of the sequence, the quantum signature preparation unit 110 may announce the positions at which the decoy qubits are located in the sequence.

Here, the recipient may notify the sender of the result of measuring the decoy qubits in the X-basis ($\{|+\rangle, |-\rangle\}$).

Here, the quantum signature preparation unit 110 may verify whether a quantum channel is secure by checking whether the state of decoy qubits prepared by itself matches the measurement result announced by the recipient, i.e., the signer or the verifier.

Also, the signer, having received the sequence, may publish m, which is the message bit string to sign, on a public board. Here, the length of the message, |m|, is not fixed.

Anyone is allowed to view information on the public board, but it is impossible to falsify the information.

The public board may be implemented using message authentication code, an entity authentication method, and the like.

Using a first encoding value $\alpha_i$, the first secret key $K_{TA}$, and the first Bell state $|\Phi^+\rangle_{A,T_a}$, the first quantum signature verification unit 120 may verify a quantum signature, with which the signer has signed a message using the first encoding value $\alpha_1$, the first secret key $K_{TA}$, and the first Bell state $|\Phi^+\rangle_{A,T_a}$.

First, the signer may calculate the hash value of the message, as shown in Equation (3):

$$h(m)=[h(m_1), h(m_2), \ldots, h(m_{2n})] \qquad (3)$$

where $h(m_1) \in \{0, 1\}$, and $|h(m)|=2n$

Here, the signer may group the bits of the hash value of the message by two bits, as shown in Equation (4):

$$h(m)=[\{h(m_1)^1, h(m_2)^1\}, \{h(m_3)^2, h(m_4)^2\}, \ldots, \{h(m_{2n-1})^n, h(m_{2n})^n\}] \qquad (4)$$

Here, the hash value of the message has the length of 2n (n being an integer that is equal to or greater than 1), and may be configured with n groups by grouping the bits thereof by two bits.

Also, the signer may generate a first random bit string $r_a$, which has a length of 2n and is randomly selected by itself, as shown in Equation (5):

$$r_a = \{(r_{a1}^1, r_{a2}^1), (r_{a1}^2, r_{a2}^2), \ldots, (r_{a1}^n, r_{a2}^n)\} \quad (5)$$

Here, the first random bit string $r_a$ has a preset length of 2n (n being an integer that is equal to or greater than 1), and may be configured with n groups by grouping the bits thereof by two bits.

Here, the signer may calculate the first encoding value $\alpha_i$ by performing a cryptographic operation on the hash value of the message and the first random bit string $r_a$, as shown in Equation (6):

$$\alpha_i = h(m_{2i-1})^i h(m_{2i})^i \oplus r_{a1}^i r_{a2}^i \in \{00, 01, 10, 11\} \quad (6)$$

where $1 \leq i \leq n$

Here, the signer may transform the first encoding value $\alpha_i$ ($\{00, 01, 10, 11\}$) by matching them to Pauli operators $\{I, \sigma_x, i\sigma_y, \sigma_z\}$.

Here, the signer may generate a rotation operator $R_y(\theta_{K_{TAi}})$ that is based on the ŷ axis using the first secret key $K_{TA}$, as shown in Equation (7):

$$R_y(\theta_{K_{TAi}}) \equiv \exp\left(\frac{-i\theta_{K_{TAi}}\sigma_y}{2}\right) = \cos\frac{\theta_{K_{TAi}}}{2} I - i\sin\frac{\theta_{K_{TAi}}}{2}\sigma_y \quad (7)$$

where $\theta_{K_{TAi}} \in \{\theta_0, \theta_1\}$

Here, $\theta_0$ and $\theta_1$ may be random angles autonomously defined only between the apparatus 100 for a reliable quantum signature and the signer. It does not matter if $\theta_0$ and $\theta_1$ are not orthogonal to each other. Here, $\theta_0$ and $\theta_1$ may correspond to $K_{TAi}=0$ and $K_{TAi}=1$, respectively.

Here, the signer may generate a first signature state $|sign^A\rangle$ using the A-sequence, the rotation operator, and the first encoding value $\alpha_i$, as shown in Equation (8):

$$|sign^A\rangle = R_y(\theta K_{TAi})\alpha_i|A_i\rangle \quad (8)$$

Here, $i = \{1, 2, \ldots, n\}$, $\alpha_i = \{I, \sigma_x, i\sigma_y, \sigma_z\}$, and $|A_i\rangle$ is a quantum state that configures the A-sequence. That is, the A-sequence = $(|A_1\rangle, |A_2\rangle, \ldots, |A_n\rangle)$.

Here, the signer may transmit the first signature state $|sign^A\rangle$ to the apparatus 100 for a reliable quantum signature using a quantum channel.

Here, the signer may transmit the first signature state $|sign^A\rangle$ to the apparatus 100 for a reliable quantum signature using the above-described transmission method in which decoy qubits are used in order to guarantee the security of the quantum channel.

Also, the first quantum signature verification unit 120 may apply the rotation operator $R_y(-\theta_{K_{TAi}})$ to the first signature state $|sign^A\rangle$, which is received from the signer, and may generate a quantum state using a qubit corresponding to the position i in the $T_A$-sequence, as shown in Equation (9):

$$|\psi\rangle_{A,T_a} = (R_y(-\theta_{K_{TAi}}) \otimes I)(R_y(\theta_{K_{TAi}}) \otimes I)|\Phi^+\rangle_{A,T_a} = (\alpha_i \otimes I)|\Phi^+\rangle_{A,T_a} \quad (9)$$

Here, $|\psi\rangle_{A T_a}$ may be any one of four Bell states.

That is, the first quantum signature verification unit 120 may restore the first encoding value $\alpha_i$ by receiving the first signature state $|sign^A\rangle$ for signing the message from the signer, and may acquire a second random bit string $r_a'$ using the hash value of the message.

Here, the first quantum signature verification unit 120 performs Bell state measurements (BSM) on the quantum state $|\psi\rangle_{A,T_a}$, thereby restoring the first encoding value $\alpha_i$.

Here, the first quantum signature verification unit 120 may decrypt the second random bit string $r_a'$ based on Equation (6) using the first encoding value $\alpha_i$.

This is because the hash value of the message, h(m), may be calculated using the universal hash function h that the quantum signature preparation unit 110 shares with the signer.

Here, the message m is not secret information, and the signer may publish the message m on the public board.

Here, the first quantum signature verification unit 120 may decrypt the second random bit string $r_a'$ using the first encoding value $\alpha_i$ based on Equation (6).

Here, the first quantum signature verification unit 120 may randomly select n bits from the second random bit string $r_a'$. Here, the length of the second random bit string $r_a'$ is 2n.

Here, the first quantum signature verification unit 120 checks whether the selected n bits match bits of the first random bit string $r_a$ that are located in the same positions as the selected n bits, thereby verifying the quantum signature.

Here, the first quantum signature verification unit 120 may notify the signer of the positions of the selected bits, and may receive bits of the first random bit string $r_a$, which are located in the same positions as the selected bits, by requesting the same from the signer.

Here, the first quantum signature verification unit 120 compares some bits (($r_1^j, r_2^j$)) of the first random bit string $r_a$, which are received from the signer, with $r_a'((r_1^{'j}, r_2^{'j}))$, which are randomly selected from the second random bit string $r_a'$, thereby verifying the signature.

That is, the first quantum signature verification unit 120 may check whether $r_{a1}^j r_{a2}^j = r_{a1}^{'j} r_{a2}^{'j}$ is satisfied. When $r_{a1}^j r_{a2}^j = r_{a1}^{'j} r_{a2}^{'j}$ is satisfied, V may be set to 1 (V=1), but otherwise, V may be set to 0 (V=0). Here, the superscript 'j' may represent the specific position between 1 and n, which is selected by the first quantum signature verification unit 120.

The second quantum signature verification unit 130 may finally verify the quantum signature of the message using the verifier, a second encoding value $\beta_l$, a third encoding value $\gamma_l$, the second secret key $K_{TB}$, and the second Bell state $|\Phi^+\rangle_{B,T_b}$.

Here, the second quantum signature verification unit 130 may generate a third random bit string $r_b$ having n bits, as shown in Equation (10):

$$r_b = \{(r_{b1}^1 r_{b2}^1), (r_{b1}^2, r_{b2}^2), \ldots, (r_{b1}^{n/2}, r_{b2}^{n/2})\} \quad (10)$$

Here, the second quantum signature verification unit 130 may calculate the second encoding value $\beta_l$ by performing a cryptographic operation on the hash value of the message from which bits located in the same positions as the selected n bits are excluded, the second random bit string $r_a'$ from which selected n bits are excluded, and the third random bit string $r_b$, as shown in Equation (11):

$$\beta_l = h(m_1)^l h(m_2)^l \oplus r_{a1'}^l r_{a2'}^l \oplus r_{b1}^l r_{b2}^l \in \{00, 01, 10, 11\} \quad (11)$$

where $1 \leq l \leq \frac{n}{2}$

That is, excluding the positions of bits used in the process of verifying the first signature state $|sign^A\rangle$, the final verification of the quantum signature may be performed.

The second encoding value $\beta_l$ may be transformed into $\beta_l \equiv \{I, \sigma_x, i\sigma_y, \sigma_z\}$ by matching the value thereof to Pauli operators, similar to the transformation of the first encoding value $\alpha_i$.

Here, the second quantum signature verification unit 130 may generate a second signature state $|sign^{A'}\rangle$ using the $T_B$-sequence, the rotation operator, and the second encoding value as shown in Equation (12):

$$|sign^{A'}\rangle = R_y(-\theta_{K_{TBi}})\beta_l|T_{Bl}\rangle \quad (12)$$

Here, the rotation operator $R_y(-\theta_{K_{TBi}})$ may be the rotation operator shared between the apparatus 100 for a reliable quantum signature and the verifier, similar to the process of defining the rotation operator between the signer and the first quantum signature verification unit 120. Also, $|T_{Bl}\rangle$ may be the quantum state that configures the $T_B$-sequence, which is generated and stored by the quantum signature preparation unit 110.

Here, the second quantum signature verification unit 130 may transmit the second signature state $|sign^{A'}\rangle$ and V, which is generated by the first quantum signature verification unit 120, to the verifier.

Here, for secure transmission, the second quantum signature verification unit 130 may transmit the second signature state $|sign^{A'}\rangle$ to the verifier using the transmission method in which decoy qubits are used in order to guarantee the security of a quantum channel.

Here, the verifier may generate a quantum state by applying the second Bell state $|\Phi^+\rangle_{B,T_b}$, which is shared with the quantum signature preparation unit 110, to the second quantum state $|sign^{A'}\rangle$, which is received from the apparatus 100 for a reliable quantum signature, as shown in Equation (13):

$$|\psi\rangle_{B,T_b} = (I \otimes R_y(-\theta_{K_{TBi}})\beta_l)|\Phi^+\rangle_{B,T_b} \quad (13)$$

Here, the verifier may notify the apparatus 100 for a reliable quantum signature of reception of the second signature state $|sign^{A'}\rangle$.

Here, when V, which is received from the apparatus 100 for a reliable quantum signature, is equal to 0, the verifier may deny validity of the signature because the signature is not valid. On the other hand, when V is equal to 1, the verifier may decrypt the third encoding value $\gamma_l$ using the result of Bell measurements, as shown in Equation (14):

$$\gamma_l = r_{a1}{}^l r_{a2}{}^l \oplus r_{b1}{}^l r_{b2}{}^l \quad (14)$$

That is, the third encoding value $\gamma_l$ may be acquired by performing a cryptographic operation on the second random bit string $r_a{}'$, from which the selected n bits are excluded, and the third random bit string $r_b$.

To this end, the verifier may decrypt the quantum state of Equation (13) using the rotation operator $R_y(\theta_{K_{TBi}})$ in which the second secret key $K_{TB}$ shared with the apparatus 100 for a reliable quantum signature is used, as shown in Equation (15):

$$|\psi\rangle'_{B,T_b} = (I \otimes R_y(-\theta_{K_{TBi}})\beta_l)|\psi\rangle_{B,T_b} = \\ (I \otimes \beta_l)|\Phi^+\rangle_{B,T_b} = [I \otimes (h(m_1)^l h(m_2)^l \oplus \gamma_l)]|\Phi^+\rangle_{B,T_b} \quad (15)$$

Here, $|\psi\rangle_{B,T_b}$ is one of the four Bell states, and the verifier may decrypt the third encoding value $\gamma_l$ using the result of Equation (15).

Here, the verifier may publish $\gamma$, which is the set of the decrypted third encoding values $\gamma_l$, on the public board. The public board may be implemented using message authentication code, an entity authentication method, and the like. Here, l satisfies $$1 \leq l \leq \frac{n}{2},$$

and $\gamma = \{\gamma_1, \gamma_2, \ldots, \gamma_{n/2}\}$.

Here, the signer may confirm that the third encoding value $\gamma_l$ is published, and may publish the first random bit string $r_a$ on the public board.

Here, the second quantum signature verification unit 130 may confirm that the verifier publishes the third encoding value and may confirm that the signer publishes the first random bit string $r_a$ after confirming publication of the third encoding value $\gamma_l$.

Here, the second quantum signature verification unit 130 checks whether the third encoding value $\gamma_l$ is equal to a fourth encoding value $\gamma_l'$, which is acquired by performing a cryptographic operation on the third random bit string $r_b$ and the first random bit string $r_a$, from which bits located in the same positions as the selected n bits are excluded, thereby finally verifying the quantum signature.

That is, the second quantum signature verification unit 130 may check whether the fourth encoding value $\gamma_l'$ satisfies $\gamma_l' = r_{a1}{}^l r_{a2}{}^l \oplus r_{b1}{}^l r_{b2}{}^l$.

Here, if the signature of the signer is valid, the first random bit string $r_a$ must be the same as the second random bit string $r_a'$.

Accordingly, the second quantum signature verification unit 130 checks whether the third encoding value $\gamma_l = r_{a1}{}^l r_{a2}{}^l \oplus r_{b1}{}^l r_{b2}{}^l$ is equal to the fourth encoding value $\gamma_l' = r_{a1}{}^l r_{a2}{}^l \oplus r_{b1}{}^l r_{b2}{}^l$, and may notify the users of validity of the signature of the signer.

Here, if the signature is valid, the second quantum signature verification unit 130 may set V' to 1 (V'=1) and publish the same on the public board, but otherwise, the second quantum signature verification unit 130 may set V' to 0 (V'=0) and publish the same on the public board.

Here, the public board may be implemented using message authentication code, an entity authentication method, and the like.

Figure 3:
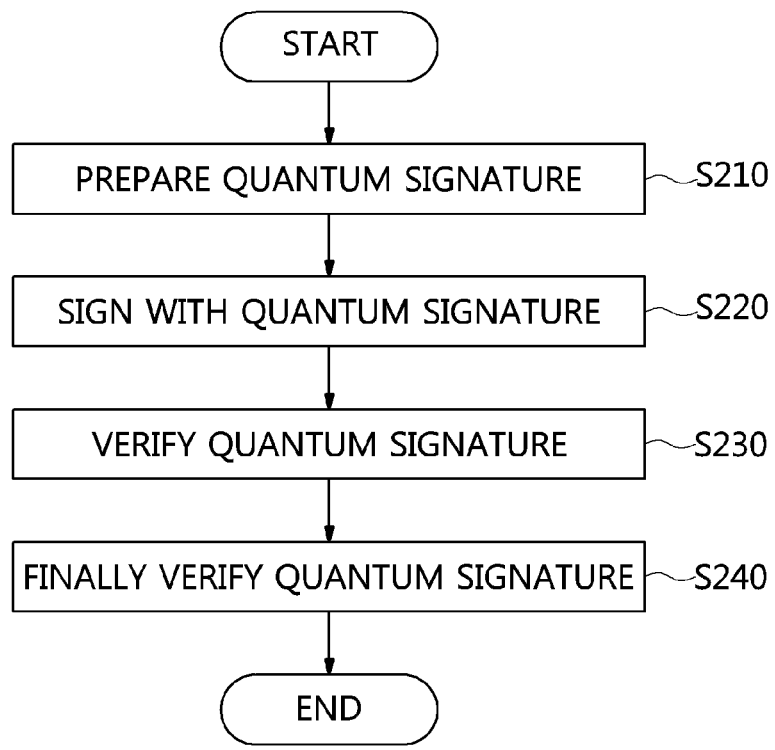
FIG. 3 is a flowchart that shows a method for a reliable quantum signature according to an embodiment of the present invention.
Figure 4:
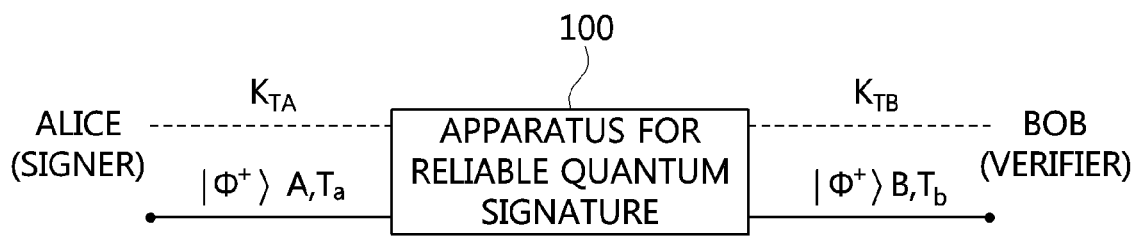
FIG. 4 is a view that shows the process of preparing a quantum signature according to an embodiment of the present invention.
Figure 5:
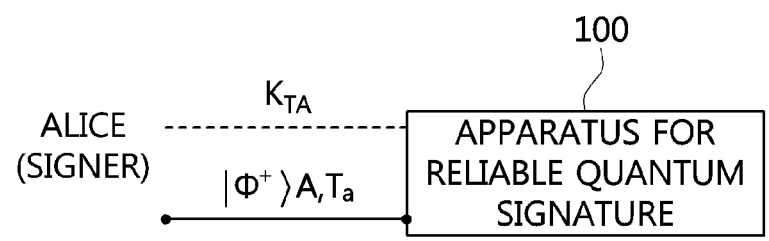
FIG. 5 is a view that shows the process of signing with a quantum signature according to an embodiment of the present invention.

FIG. 3 is a flowchart that shows a method for a reliable quantum signature according to an embodiment of the present invention. FIG. 4 is a view that shows the process of preparing a quantum signature according to an embodiment of the present invention. FIG. 5 is a view that shows the process of signing with a quantum signature according to an embodiment of the present invention. FIG. 6 is a view that shows the process of verifying a quantum signature according to an embodiment of the present invention.

Referring to FIG. 3, in the method for a reliable quantum signature according to an embodiment of the present invention, first, a quantum signature may be prepared at step S210.

That is, at step S210, the apparatus 100 for a reliable quantum signature may prepare a quantum signature by sharing a first secret key $K_{TA}$ and a first Bell state $|\Phi^+\rangle_{A,T_a}$ with a signer and by sharing a second secret key $K_{TB}$ and a second Bell state $|\Phi^+\rangle_{B,T_b}$ with a verifier.

First, the signer, the verifier, and the apparatus 100 for a reliable quantum signature, which are trusted users, may share a universal hash function h.

Here, at step S210, the apparatus 100 for a reliable quantum signature may share the universal hash function with the signer and the verifier.

The universal hash function may satisfy Equation (1).

That is, h may receive a bit string having an arbitrary length and output a bit string having a fixed length (2n).

Here, h may configure an efficient communication protocol by making use of a message reduction effect.

Also, h may perform message authentication as a one-way function.

Here, at step S210, the apparatus 100 for a reliable quantum signature may share the first secret key $K_{TA}$ and the second secret key $K_{TB}$ with the signer (Alice) and the verifier (Bob), respectively. Here, the length of each of the first secret key $K_{TA}$ and the second secret key $K_{TB}$ must be equal to or greater than n.

Here, at step S210, the apparatus 100 for a reliable quantum signature may share the keys using Quantum Key Distribution (QKD), which provides unconditional security.

Also, at step S210, the apparatus 100 for a reliable quantum signature may prepare n first Bell states $|\Phi^+\rangle_{A,T_a}$ and n second Bell states $|\Phi^+\rangle_{B,T_b}$.

Bell states may be represented as shown in Equation (2).

Here, at step S210, the apparatus 100 for a reliable quantum signature may divide the n first Bell states $|\Phi^+\rangle_{A,T_a}$ into an A-sequence and a $T_A$-sequence, and may divide the n second Bell states $|\Phi^+\rangle_{B,T_b}$ into a B-sequence and a $T_B$-sequence.

Here, each of the sequences may consist of n quantum bits (qubits).

Here, the n quantum bits may be represented as follows: the A-sequence is $(A_1, A_2, \ldots, A_n)$, the $T_A$-sequence is $(T_{a1}, T_{a2}, \ldots, T_{an})$, the B-sequence is $(B_1, B_2, \ldots, B_n)$, and the $T_B$-sequence is $(T_{b1}, T_{b2}, \ldots, T_{bn})$.

Here, at step S210, the apparatus 100 for a reliable quantum signature may transmit the A-sequence and the B-sequence to the signer and the verifier, respectively.

Here, at step S210, the apparatus 100 for a reliable quantum signature may keep the $T_A$-sequence and the $T_B$-sequence.

Also, at step S210, the apparatus 100 for a reliable quantum signature may transmit the sequences using a transmission method in which decoy qubits are used in order to guarantee the security of a quantum channel.

Here, at step S210, in order to securely transmit qubits in a sequence, the apparatus 100 for a reliable quantum signature may form a new sequence by mixing the qubits in the sequence with decoy qubits that are randomly selected from among $$|+\rangle\left(=\frac{1}{\sqrt{2}}(|0\rangle+|1\rangle)\right) \text{ and } |-\rangle\left(=\frac{1}{\sqrt{2}}(|0\rangle-|1\rangle)\right),$$

and may transmit the new sequence.

Here, at step S210, when a recipient announces reception of the sequence, the positions at which the decoy qubits are located in the sequence may be announced.

Here, the recipient may notify the sender of the result of measuring the decoy qubits in the X-basis ($\{|+\rangle, |-\rangle\}$).

Here, at step S210, whether a quantum channel is secure may be verified by checking whether the state of decoy qubits prepared by the apparatus 100 for a reliable quantum signature matches the measurement result announced by the recipient, i.e., the signer or the verifier.

Also, the signer, having received the sequence, may publish m, which is the message bit string to sign, on a public board. Here, the length of the message, |m|, is not fixed.

Anyone is allowed to view information on the public board, but it is impossible to falsify the information.

Here, the public board may be implemented using message authentication code, an entity authentication method, and the like.

Here, the process at step S210 is illustrated in FIG. 4.

Also, in the method for a reliable quantum signature according to an embodiment of the present invention, a quantum signature may be written at step S220.

That is, at step S220, the signer may sign a message with a quantum signature using a first encoding value $\alpha_i$, the first secret key $K_{TA}$, and the first Bell state) $|\Phi^+\rangle_{A,T_a}$.

First, at step S220, the signer may calculate the hash value of the message, as shown in Equation (3).

Here, at step S220, the signer may group the bits of the hash value of the message by two bits, as shown in Equation (4).

Here, the hash value of the message has a length of 2n (n being an integer that is equal to or greater than 1), and may be configured with n groups by grouping the bits thereof by two bits.

Here, at step S220, the signer may generate a first random bit string $r_a$, which has a length of 2n and is randomly selected by itself, as shown in Equation (5).

Here, the first random bit string $r_a$ has a preset length of 2n (n being an integer that is equal to or greater than 1), and may be configured with n groups by grouping the bits thereof by two bits.

Here, at step S220, the signer may calculate the first encoding value $\alpha_i$, by performing a cryptographic operation on the hash value of the message and the first random bit string $r_a$, as shown in Equation (6).

Here, at step S220, the signer may transform the first encoding value $\alpha_i$ (\{00, 01, 10, 11\}) by matching them to Pauli operators $\{I, \sigma_x, i\sigma_y, \sigma_z\}$.

Here, at step S220, the signer may generate a rotation operator $R_y(\theta_{K_{TAi}})$ that is based on the $\hat{y}$ axis using the first secret key $K_{TA}$, as shown in Equation (7).

Here, $\theta_{K_{TAi}} \in \{\theta_0, \theta_1\}$ and $\theta_0$ and $\theta_1$ may be random angles autonomously defined only between the apparatus 100 for a reliable quantum signature and the signer. It does not matter if $\theta_0$ and $\theta_1$ are not orthogonal to each other. Here, $\theta_0$ and $\theta_1$ may correspond to $K_{TAi}=0$ and $K_{TAi}=1$, respectively.

Here, at step S220, the signer may generate a first signature state $|sign^A\rangle$ using the A-sequence, the rotation operator, and the first encoding value $\alpha_i$, as shown in Equation (8).

Here, at step S220, the signer may transmit the first signature state $|sign^A\rangle$ to the apparatus 100 for a reliable quantum signature using a quantum channel.

Here, at step S220, the signer may transmit the first signature state $|sign^A\rangle$ to the apparatus 100 for a reliable quantum signature using the above-described transmission method in which decoy qubits are used in order to guarantee the security of a quantum channel.

Also, in the method for a reliable quantum signature according to an embodiment of the present invention, the quantum signature may be verified at step S230.

That is, at step S230, the apparatus 100 for a reliable quantum signature may verify the quantum signature of the message using the first signature state $|sign^A\rangle$, the first secret key $K_{TA}$, and the first Bell state $|\Phi^+\rangle_{A,T_a}$.

Here, at step S230, the apparatus 100 for a reliable quantum signature may apply the rotation operator $R_y(-$ $\theta_{K_{TAi}}$) to the first signature state $|sign^A\rangle$, which is received from the signer, and may generate a quantum state using a qubit corresponding to the position i in the $T_A$-sequence, as shown in Equation (9).

Here, at step S230, the apparatus 100 for a reliable quantum signature may restore the first encoding value $\alpha_i$ by receiving the first signature state $|sign^A\rangle$ for signing the message from the signer, and may acquire a second random bit string $r_a'$ using the hash value of the message.

Here, at step S230, the apparatus 100 for a reliable quantum signature performs Bell state measurements (BSM) on the quantum state $|\psi\rangle_{A,T_a}$, thereby restoring the first encoding value $\alpha_i$.

Here, at step S230, the apparatus 100 for a reliable quantum signature may decrypt the second random bit string $r_a'$ using the first encoding value $\alpha_i$ based on Equation (6).

This is because the hash value of the message, h(m), may be calculated using the universal hash function h, which is shared with the signer at step S210.

Here, the message m is not secret information, and the signer may publish the message m on the public board.

Here, at step S230, the apparatus 100 for a reliable quantum signature may decrypt the second random bit string $r_a'$ using the first encoding value $\alpha_i$ based on Equation (6).

Here, at step S230, the apparatus 100 for a reliable quantum signature may randomly select n bits from the second random bit string $r_a'$. Here, the length of the second random bit string $r_a'$ is 2n.

Here, at step S230, the apparatus 100 for a reliable quantum signature checks whether the selected n bits match bits of the first random bit string $r_a$, which are located in the same positions as the selected n bits, thereby verifying the quantum signature.

Here, at step S230, the apparatus 100 for a reliable quantum signature may notify the signer of the positions of the selected bits, and may receive bits of the first random bit string $r_a$ that are located in the same positions as the selected bits by requesting the same from the signer.

Here, at step S230, the apparatus 100 for a reliable quantum signature compares some bits (($r_1^j$, $r_2^j$)) of the first random bit string $r_a$, which are received from the signer, with $r_a'((r_1'^j, r_2'^j))$ which are randomly selected from the second random bit string $r_a'$, thereby verifying the signature.

That is, at step S230, the apparatus 100 for a reliable quantum signature may check whether $r_{a1}^j r_{a2}^j = r'_{a1}{}^j r'_{a2}{}^j$ is satisfied. When $r_{a1}^j r_{a2}^j = r'_{a1}{}^j r'_{a2}{}^j$ is satisfied, V may be set to 1 (V=1), but otherwise, V may be set to 0 (V=0). Here, the superscript 'j' may represent the specific position between 1 and n, which is selected by the apparatus 100 for a reliable quantum signature.

Here, the process at steps S220 and S230 is illustrated in FIG. 5.

Also, in the method for a reliable quantum signature according to an embodiment of the present invention, the quantum signature may be finally verified at step S240.

That is, at step S240, the apparatus 100 for a reliable quantum signature may finally verify the quantum signature of the message using the verifier, a second encoding value $\beta_l$, a third encoding value $\gamma_l$, the second secret key $K_{TB}$, and the second Bell state $|\Phi^+\rangle_{B,T_b}$.

Here, at step S240, the apparatus 100 for a reliable quantum signature may generate a third random bit string $r_b$ having n bits, as shown in Equation (10).

Here, at step S240, the apparatus 100 for a reliable quantum signature may calculate the second encoding value $\beta_l$ by performing a cryptographic operation on the hash value of the message from which bits located in the same positions as the selected n bits are excluded, the second random bit string $r_a'$ from which the selected n bits are excluded, and the third random bit string $r_b$, as shown in Equation (11).

That is, excluding the positions of bits used in the process of verifying the first signature state $|sign^A\rangle$, the final verification of the quantum signature may be performed.

The second encoding value $\beta_l$ may be transformed into $\beta_l \equiv \{I, \sigma_x, i\sigma_y, \sigma_z\}$ by matching the value thereof to Pauli operators, similar to the transformation of the first encoding value $\alpha_i$.

Here, at step S240, the apparatus 100 for a reliable quantum signature may generate a second signature state $|sign^{A'}\rangle$ using the $T_B$-sequence, the rotation operator, and the second encoding value $\beta_l$, as shown in Equation (12).

Here, the rotation operator $R_y(-\theta_{K_{TBi}})$ may be the rotation operator shared between the apparatus 100 for a reliable quantum signature and the verifier, similar to the process of defining the rotation operator between the signer and the first quantum signature verification unit 120. Also, $|T_{Bi}\rangle$ may be the quantum state that configures the $T_B$-sequence, which is generated and stored by the quantum signature preparation unit 110.

Here, at step S240, the apparatus 100 for a reliable quantum signature may transmit the second signature state $|sign^{A'}\rangle$ and V, which is generated by the first quantum signature verification unit 120, to the verifier.

Here, at step S240, for secure transmission, the apparatus 100 for a reliable quantum signature may transmit the second signature state $|sign^{A'}\rangle$ to the verifier using the transmission method in which decoy qubits are used in order to guarantee the security of a quantum channel.

Here, at step S240, the verifier may generate a quantum state by applying the second Bell state $|\Phi^+\rangle_{B,T_b}$, which is shared with the quantum signature preparation unit 110, to the second quantum state $|sign^{A'}\rangle$, which is received from the apparatus 100 for a reliable quantum signature, as shown in Equation (13).

Here, at step S240, the verifier may notify the apparatus 100 for a reliable quantum signature of reception of the second signature state $|sign^{A'}\rangle$.

Here, at step S40, when V, which is received from the apparatus 100 for a reliable quantum signature, is equal to 0, the verifier may deny validity of the signature because the signature is not valid. Conversely, when V is equal to 1, the verifier may decrypt the third encoding value $\gamma_l$ using the result of Bell measurements, as shown in Equation (14).

That is, the third encoding value $\gamma_l$ may be acquired by performing a cryptographic operation on the second random bit string $r_a'$ from which the selected n bits are excluded and the third random bit string $r_b$.

To this end, the verifier may decrypt the quantum state of Equation (13) at step S240 using the rotation operator $R_y(\theta_{K_{TBi}})$, in which the second secret key $K_{TB}$, shared with the apparatus 100 for a reliable quantum signature, is used, as shown in Equation (15).

Here, $|\psi\rangle_{B,T_b}'$ is one of the four Bell states, and the verifier may decrypt the third encoding value $\gamma_l$ using the result of Equation (15).

Here, at step S240, the verifier may publish $\gamma$, which is the set of the decrypted third encoding values $\gamma_l$, on the public board. The public board may be implemented using message authentication code, an entity authentication method, and the like. Here, l satisfies $$1 \le l \le \frac{n}{2},$$

and $\gamma = \{\gamma_1, \gamma_2, \ldots \gamma_{n/2}\}$.

Here, at step S240, the signer may confirm that the third encoding value $\gamma_l$ is published, and may publish the first random bit string $r_a$, on the public board.

Here, at step S240, the verifier may publish the third encoding value $\gamma_l$.

Here, at step S240, the signer may publish the first random bit string $r_a$, after confirming publication of the third encoding value $\gamma_l$.

Here, at step S240, the apparatus 100 for a reliable quantum signature may confirm the published first random bit string $r_a'$.

Here, at step S240, the apparatus 100 for a reliable quantum signature checks whether the third encoding value $\gamma_l$ is equal to a fourth encoding value $\gamma_l'$, which is acquired by performing a cryptographic operation on the third random bit string $r_b$ and the first random bit string $r_a$, from which bits located in the same positions as the selected n bits are excluded, thereby finally verifying the quantum signature.

That is, at step S240, the apparatus 100 for a reliable quantum signature may check whether the fourth encoding value $\gamma_l'$ satisfies $\gamma_l' = r_{a1}^l r_{a2}^l \oplus r_{b1}^l r_{b2}^l$.

Here, if the signature of the signer is valid, the first random bit string $r_a$, must be the same as the second random bit string $r_a'$.

Accordingly, at step S240, the apparatus 100 for a reliable quantum signature checks whether the third encoding value $\gamma_l = r_{b1}^l r_{b2}^l$ is equal to the fourth encoding value $\gamma_l' = r_{a1}^l r_{a2}^l \oplus r_{b1}^l r_{b2}^l$, and may notify the users of the validity of the signature of the signer.

Here, at step S240, if the signature is valid, the apparatus 100 for a reliable quantum signature may set V' to 1 (V'=1) and publish the same on the public board, but otherwise, the apparatus 100 for a reliable quantum verification may set V' to 0 (V'=0) and publish the same on the public board. The public board may be implemented using message authentication code, an entity authentication method, and the like.

Here, the process at step S240 is illustrated in FIG. 6.

Figure 7:
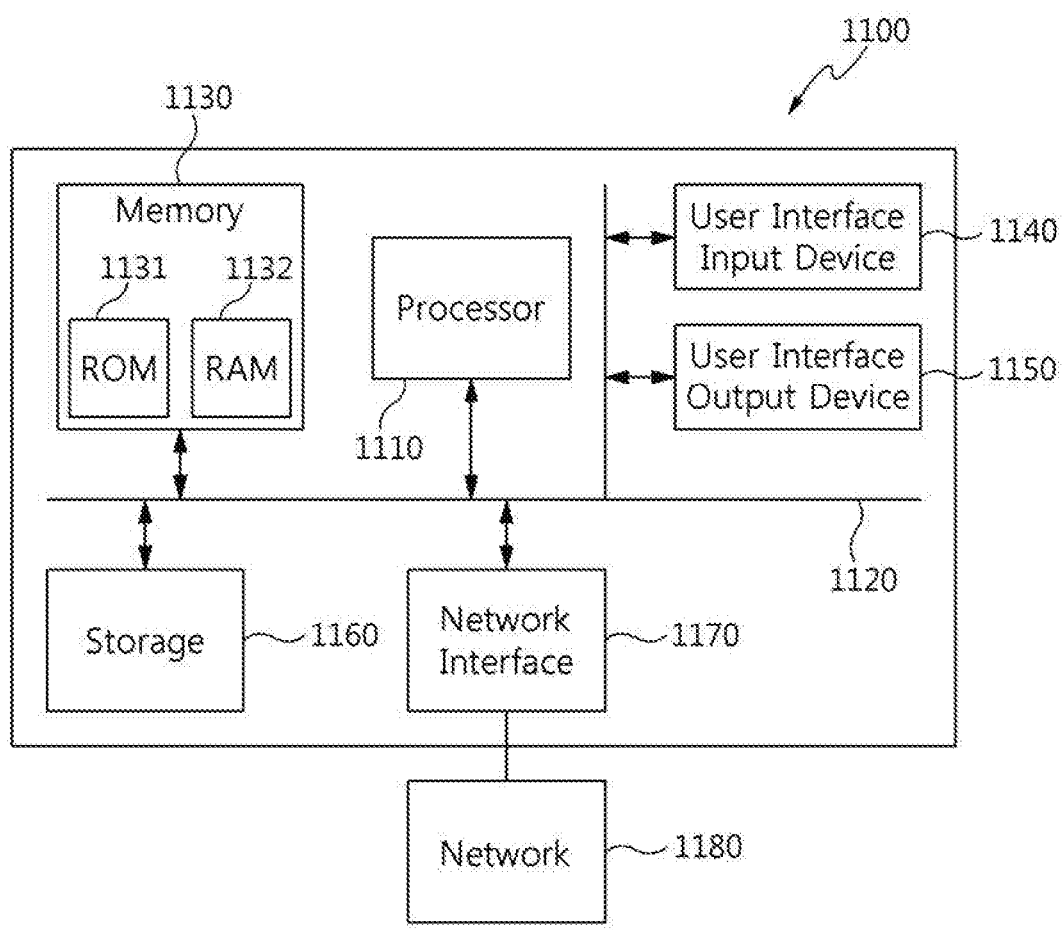
FIG. 7 is a view that shows a computer system according to an embodiment of the present invention.

FIG. 7 is a block diagram that shows a computer system according to an embodiment of the present invention.

Referring to FIG. 7, the apparatus 100 for a reliable quantum signature, the signer terminal device, and the verifier terminal device according to an embodiment of the present invention may be implemented in a computer system 1100 including a computer-readable recording medium. As illustrated in FIG. 7, the computer system 1100 may include one or more processors 1110, memory 1130, a user-interface input device 1140, a user-interface output device 1150, and storage 1160, which communicate with each other via a bus 1120. Also, the computer system 1100 may further include a network interface 1170 connected to a network 1180. The processor 1110 may be a central processing unit or a semiconductor device for executing processing instructions stored in the memory 1130 or the storage 1160. The memory 1130 and the storage 1160 may be various types of volatile or nonvolatile storage media. For example, the memory may include ROM 1131 or RAM 1131.

The security of the apparatus and method for a reliable quantum signature according to an embodiment of the present invention may be discussed in terms of message authentication, integrity, and non-repudiation, which are essential requirements of a digital signature. When these three services are provided without any problem, the security of the method is ensured and the essential requirements of a digital signature are satisfied.

Message authentication in the apparatus and method for a reliable quantum signature according to an embodiment of the present invention is described below.

In order to generate a signature, a signer may use a first random bit string $r_a$, which it generates itself, a universal hash function h shared between trusted users, and $K_{TA}$ and a quantum state (a first Bell state) $|\Phi^+\rangle^A$, which are shared with the apparatus 100 for a reliable quantum signature. This information may also be used when the apparatus 100 for a reliable quantum signature verifies the signature of the signer. Also, rotation operators $R_y(\theta_{K_{TA}})$ and $R_y(-\theta_{K_{TA}})$ are secret protocols and information that are known only to the signer and the apparatus 100 for a reliable quantum signature. That is, the fact that the signature generated by the signer can be generated only by the signer may be verified and guaranteed by the apparatus 100 for a reliable quantum signature.

Integrity in the apparatus and method for a reliable quantum signature according to an embodiment of the present invention is described below.

In the apparatus and method for a reliable quantum signature according to an embodiment of the present invention, a hash function h and a public board may be used. With regard to a signature, a message m is published on the public board. Anyone is allowed to view information on the public board, but the information thereon cannot be falsified. Therefore, it is statistically highly improbable to find m' that satisfies the condition in which the result of application of m' to the universal hash function, which is shared between trusted users, matches the result of application of m, which is published on the public board, to the universal hash function, that is, the condition in which h(m)=h(m') is satisfied. That is, if an attacker with which h is not shared generates a signature, this may be turned out to be invalid at the verification step ($\because$ h(m)≠h(m'), $r_a \ne r_a'$).

Finally, non-repudiation service in the apparatus and method for a reliable quantum signature according to an embodiment of the present invention is described below.

Non-repudiation includes a service for preventing a signer from denying a valid signature, and this service may be used to respond to the situation in which a verifier denies the valid signature. Non-repudiation in the proposed quantum signature protocol may be provided using the apparatus 100 for a reliable quantum signature and a public board.

At step S240, when the signer publishes a first random bit string $r_a$ that differs from the actual one in order to repudiate the signature thereof, the apparatus 100 for a reliable quantum signature may detect that the first random bit string $r_a$ differs from the second random bit string $r_a'$. Accordingly, the apparatus 100 for a reliable quantum signature may detect the signer's repudiation. Conversely, when the verifier publishes an incorrect third encoding value $\gamma$ in order to repudiate the valid signature, the apparatus 100 for a reliable quantum signature may detect the verifier's repudiation at step S240, which is the final verification step. The verifier is able to falsify the third encoding value $\gamma$ consisting of classical bits, but is not able to falsify or repudiate the third encoding value $\gamma$ transmitted in a quantum state. When the third encoding value $\gamma'$ falsified by the verifier is published on the public board, the apparatus 100 for a reliable quantum signature may detect that the third encoding value is falsified. That is, the apparatus 100 for a reliable quantum signature may detect the falsified third encoding value $\gamma'$ published on the public board, which differs from the third encoding value γ that the apparatus 100 itself transmitted over the quantum channel.

The present invention may reduce the amount of quantum communication compared to existing quantum signature schemes, thereby improving efficiency and reducing costs.

Also, the present invention may provide a quantum signature scheme in which multiple verifiers may validate a signature.

Also, the present invention may provide a secure quantum signature scheme that provides non-repudiation service.

As described above, the apparatus and method for a reliable quantum signature according to the present invention are not limitedly applied to the configurations and operations of the above-described embodiments, but all or some of the embodiments may be selectively combined and configured, so that the embodiments may be modified in various ways.

What is claimed is:

1. A method for a reliable quantum signature, in which an apparatus for a reliable quantum signature is used, comprising:
preparing a quantum signature by sharing a first secret key and a first Bell state with a signer's terminal device and by sharing a second secret key and a second Bell state with multiple verifier's terminal devices;
signing, by the signer's terminal device, a message m with the quantum signature using a first encoding value, the first secret key, and the first Bell state, wherein signing the message is configured such that the signer's terminal device calculates a first encoding value by performing a cryptographic operation on a hash value of the message and a first random bit string;
verifying, by the apparatus, the quantum signature of the message using the first encoding value, the first secret key, and the first Bell state, wherein verifying the quantum signature is configured such that the apparatus calculates a second encoding value by performing a cryptographic operation on the hash value of the message, a third random bit string and a second random bit string obtained from the first encoding value; and
finally verifying, by the apparatus, the quantum signature of the message using the verifier's terminal device, a second encoding value, third encoding values, the second secret key, and the second Bell state, wherein finally verifying the quantum signature is configured such that:
the signer's terminal device confirms that the multiple verifier's terminal devices publishes the third encoding values and publishes the first random bit string after confirming publication of the third encoding values, and
the apparatus finally verifies the quantum signature by checking whether a fourth encoding value, which is acquired by performing a cryptographic operation on the first random bit string and the third random bit string, and the third encoding values are the same.

2. The method of claim 1, wherein each of the hash value and the first random bit string has a length of 2n and is configured with n groups by grouping bits thereof by two bits (n being a preset integer that is equal to or greater than 1).

3. The method of claim 2, wherein verifying the quantum signature is configured such that the apparatus restores the first encoding value by receiving a first signature state for signing the message from the signer's terminal device and acquires a second random bit string using the hash value of the message.

4. The method of claim 3, wherein verifying the quantum signature is configured to verify the quantum signature in such a way that the apparatus selects n bits from the second random bit string and checks whether the selected n bits match bits of the first random bit string that are located in same positions as the selected n bits.

5. The method of claim 4,
wherein each of the hash value of the message, the second random bit string and the third random bit string corresponds to remaining bits excluding bits located in same positions as the selected n bits.

6. The method of claim 5, wherein finally verifying the quantum signature is configured such that one verifier's terminal device restores the second encoding value by receiving a second signature state for verifying the message from the apparatus and acquires a third encoding value using the hash value of the message from which the bits located in the same positions as the selected n bits are excluded.

7. The method of claim 6, wherein the third encoding value is a result of a cryptographic operation performed on the second random bit string and the third random bit string,
wherein each of the second random bit string and the third random bit string corresponds to remaining bits excluding bits located in same positions as the selected n bits.

8. The method of claim 1,
wherein each of the first random bit string and the third random bit string corresponds to remaining bits excluding bits located in same positions as the selected n bits.

9. An apparatus for a reliable quantum signature, comprising:
a computer comprising one or more units which are executed by at least one processor which is connected to a memory, the one or more units comprising:
a quantum signature preparation unit for preparing a quantum signature by sharing a first secret key and a first Bell state with a signer's terminal device and by sharing a second secret key and a second Bell state with a verifier's terminal device;
a first quantum signature verification unit for verifying the quantum signature of a message m using a first encoding value, the first secret key, and the first Bell state, the message being signed with the quantum signature by the signer's terminal device using the first encoding value, the first secret key, and the first Bell state, wherein signing the message is configured such that the signer's terminal device calculates the first encoding value $\alpha_i$ by performing a cryptographic operation on a hash value h of the message and a first random bit string $r_a$, wherein the first encoding value $\alpha_i$ is calculated using $$\alpha_i = h(m_{2i-1})^i h(m_{2i})^i \oplus r_{a1}^i r_{a2}^i \in \{00, 01, 10, 11\}$$

where $1 \leq i \leq n$; and
a second quantum signature verification unit for finally verifying the quantum signature of the message using the verifier's terminal device, a second encoding value, a third encoding value, the second secret key, and the second Bell state.

10. The apparatus of claim 9, wherein each of the hash value and the first random bit string has a length of 2n and is configured with n groups by grouping bits thereof by two bits (n being a preset integer that is equal to or greater than 1).

11. The apparatus of claim 10, wherein the first quantum signature verification unit restores the first encoding value by receiving a first signature state for signing the message from the signer's terminal device and acquires a second random bit string using the hash value of the message.

12. The apparatus of claim 11, wherein the first quantum signature verification unit verifies the quantum signature by selecting n bits from the second random bit string and checking whether the selected n bits match bits of the first random bit string that are located in same positions as the selected n bits.

13. The apparatus of claim 12, wherein the second quantum signature verification unit calculates the second encoding value by performing a cryptographic operation on a hash value of the message, the second random bit string and a third random bit string, wherein each of the hash value of the message, the second random bit string and the third random bit string corresponds to remaining bits excluding bits located in same positions as the selected n bits.

14. The apparatus of claim 13, wherein the second quantum signature verification unit transmits a second signature state for verifying the message to the verifier's terminal device, thereby requesting restoration of the second encoding value and acquisition of the third encoding value using the hash value of the message from which the bits located in the same positions as the selected n bits are excluded.

15. The apparatus of claim 14, wherein the third encoding value is a result of a cryptographic operation performed on the second random bit string and the third random bit string, wherein each of the second random bit string and the third random bit string corresponds to remaining bits excluding bits located in same positions as the selected n bits.

16. The apparatus of claim 15, wherein the second quantum signature verification unit confirms that the verifier's terminal device publishes the third encoding value and confirms that the signer's terminal device publishes the first random bit string after confirming publication of the third encoding value.

17. The apparatus of claim 16, wherein the second quantum signature verification unit finally verifies the quantum signature by checking whether the third encoding value is equal to a fourth encoding value, which is acquired by performing a cryptographic operation on the first random bit string and the third random bit string, wherein each of the first random bit string and the third random bit string corresponds to remaining bits excluding bits located in same positions as the selected n bits.

* * * * *